(12) United States Patent
Schock et al.

(10) Patent No.: US 12,060,027 B2
(45) Date of Patent: Aug. 13, 2024

(54) AIRBAG ARRANGEMENT

(71) Applicant: AUTOLIV DEVELOPMENT AB, Vargarda (SE)

(72) Inventors: Marc Schock, Karlsfeld (DE); Martin Unger, Berlin (DE); Johann Unger, Rohrbach (DE); Paolo Giorgini, Munich (DE); Andreas Huf, Neusäß (DE); Robert Martin, Munich (DE); Florian Ober, Reichersbeuern (DE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/044,044

(22) PCT Filed: Aug. 27, 2021

(86) PCT No.: PCT/EP2021/073699
§ 371 (c)(1),
(2) Date: Mar. 3, 2023

(87) PCT Pub. No.: WO2022/053331
PCT Pub. Date: Mar. 17, 2022

(65) Prior Publication Data
US 2023/0311806 A1   Oct. 5, 2023

(30) Foreign Application Priority Data
Sep. 10, 2020   (DE) ..................... 10 2020 123 629.8

(51) Int. Cl.
*B60R 21/2338*   (2011.01)
*B60R 21/231*   (2011.01)

(52) U.S. Cl.
CPC .... *B60R 21/2338* (2013.01); *B60R 21/23138* (2013.01); *B60R 2021/23146* (2013.01); *B60R 2021/23382* (2013.01); *B60R 2021/23384* (2013.01); *B60R 2021/23386* (2013.01); *B60R 2021/23388* (2013.01)

(58) Field of Classification Search
CPC .......... B60R 21/2338; B60R 21/23138; B60R 2021/23146; B60R 2021/23382; B60R 2021/23384; B60R 2021/23386; B60R 2021/23388; B60R 21/207; B60R 2021/0009; B60R 2021/0048
See application file for complete search history.

(56) References Cited

U.S. PATENT DOCUMENTS 9,994,181 B1   6/2018   Dubaisi et al.
10,336,283 B2   7/2019   Rickenbach et al.
(Continued)

FOREIGN PATENT DOCUMENTS

DE   102018120159 A1   9/2019
DE   102018114771 A1 *   12/2019   ........... B60R 21/207
(Continued)

*Primary Examiner* — Karen Beck
(74) *Attorney, Agent, or Firm* — Foley & Lardner LLP

(57) ABSTRACT

The invention relates to an airbag arrangement for a motor vehicle, with—an airbag (1), the airbag (1) having a first cushion layer (1.1) and a second cushion layer (1.2) opposite to the first cushion layer (1.1), and—at least one tether arrangement (2), the tether arrangement being connected to the airbag (1) and being connectable with one end to the motor vehicle outside the airbag (1).

18 Claims, 3 Drawing Sheets

(56) References Cited

U.S. PATENT DOCUMENTS

Figure 1:
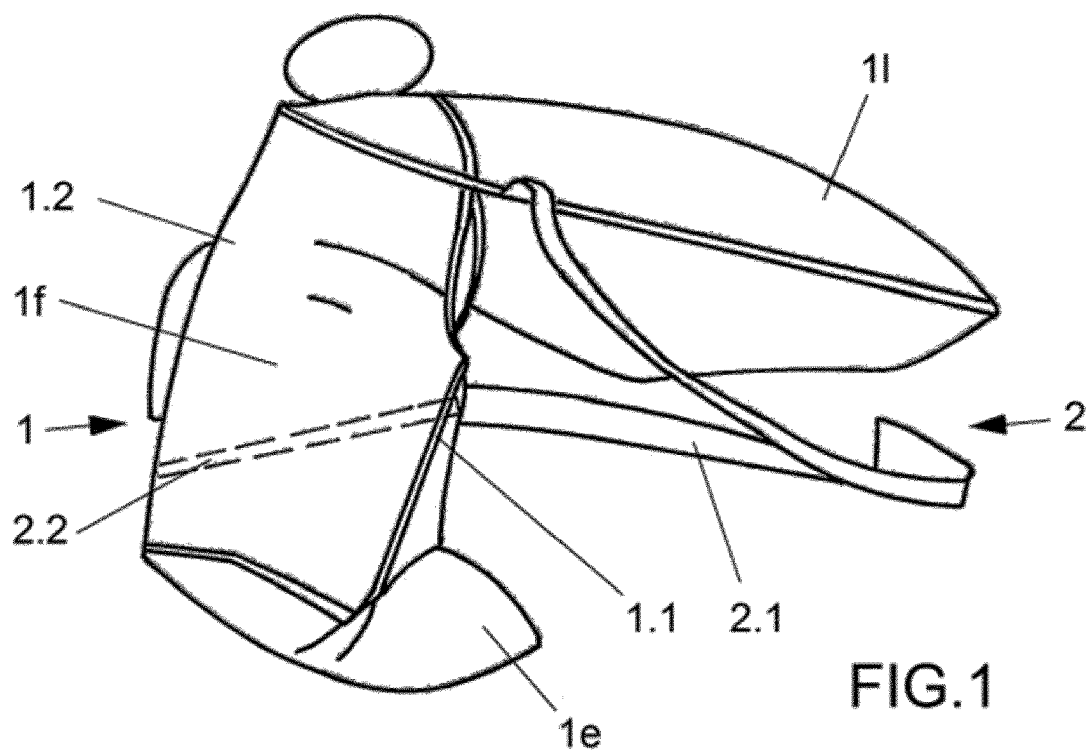

| | | | |
|---|---|---|---|
| 2011/0254256 A1* | 10/2011 | Mendez | B60R 21/239 |
| | | | 280/743.2 |
| 2012/0049498 A1* | 3/2012 | Wiik | B60R 21/2338 |
| | | | 280/743.2 |
| 2012/0306187 A1* | 12/2012 | Mendez | B60R 21/239 |
| | | | 280/743.2 |
| 2017/0182969 A1 | 6/2017 | Fujiwara | |
| 2017/0259774 A1 | 9/2017 | Matsushita | |
| 2018/0326938 A1* | 11/2018 | Rickenbach | B60R 21/2338 |
| 2019/0111884 A1 | 4/2019 | Kobayashi et al. | |
| 2019/0248322 A1 | 8/2019 | Herzenstiel et al. | |
| 2019/0283700 A1* | 9/2019 | Kwon | B60R 21/2338 |
| 2019/0299903 A1 | 10/2019 | Nagasawa | |

FOREIGN PATENT DOCUMENTS

| | | | | |
|---|---|---|---|---|
| DE | 102022101430 A1 * | 7/2022 | | |
| EP | 3459795 A1 | 3/2019 | | |
| KR | 10-2019-0126213 A | 11/2019 | | |
| WO | WO-2018125542 A1 * | 7/2018 | | B60R 21/2338 |

\* cited by examiner

AIRBAG ARRANGEMENT

The present invention relates to an airbag arrangement for a motor vehicle and to a vehicle seat arrangement for a motor vehicle comprising such an airbag arrangement. The airbag arrangement comprises an airbag, the airbag having a first cushion layer, which first cushion layer preferably faces the occupant in a deployed state of the airbag, and a second cushion layer opposite to the first cushion layer, which second cushion layer preferably faces away from the occupant in a deployed state of the airbag. The airbag arrangement further comprises at least one tether arrangement, the tether arrangement being connected to the airbag and being connectable with one end to the motor vehicle outside the airbag. The vehicle seat arrangement comprises a backrest and a seat cushion, wherein an airbag module comprising an inflator and the airbag is arranged in the backrest and/or the seat cushion, the airbag being shaped in such a way that in the deployed state a frontal section of the airbag is arranged directly in front of a central axis of the backrest and the tether arrangement being connected with its one end to the backrest. Such a vehicle seat arrangement is also known as seat centric restraint system, in which also a seat belt arrangement might be integrated in the vehicle seat.

For example, US 2017/0259774 A1 discloses a vehicle seat arrangement, in which airbag modules are arranged on both sides of the backrest, so that in the deployed state airbags are arranged laterally beside an occupant on both sides. The tethers (tensile fabrics) of this airbag arrangement, with which the deployment of the airbag is guided and with which the airbag is to be hold in a predetermined position when the occupant hits the airbag in an accident situation, is arranged along the outer surface of the airbag. In this case the location, where the tether arrangement is connected to the airbag, is distanced to the location at which the occupant hits the airbag. Therefore, in case of an accident the airbag may be deflected more than desired due to the distance between the two locations. Further airbag arrangements are disclosed in KR 10-2019-0126213 A, U.S. Pat. No. 10,336,283 and US 2019/0248322. Also, according to these airbag arrangements the location of the connection of the tether arrangement to the airbag is distanced to the location, where the occupant hits the airbag, so that an undesired deflection of the airbag might occur.

In view of this it is an object of the present invention to provide an airbag arrangement, with which the deflection of the deployed airbag from a predetermined position can be minimized.

This object is achieved with an airbag arrangement for a motor vehicle with the features of the independent claim. Further embodiments of the airbag arrangement and a vehicle seat arrangement are described in the dependent claims and in the description, wherein single features of the preferred embodiments can be combined with each other in a technical meaningful manner.

In particular the object is achieved by an airbag arrangement as described above, wherein the tether arrangement extends from the outside of the airbag through the first cushion layer to the second cushion layer inside the airbag.

Such an arrangement of the tether arrangement allows to connect the tether arrangement to the airbag closer to the location, at which the occupant hits the airbag, thereby minimizing the deflection of the airbag during an accident. Furthermore, it is possible that in the deployed state of the airbag the first cushion layer is movable relative to the tether arrangement, so that the occupant can deform the first cushion layer during an accident, while at the same time the forces from the second layer are transferred via the tether arrangement to the vehicle.

The first cushion layer is preferably that layer of the airbag, which faces the occupant in the deployed state of the airbag, while the second cushion layer is that layer of the airbag, which faces away from the occupant in the deployed state. The first cushion layer and the second cushion layer may be two separate layers (airbag fabrics), which are connected (i.e. by a seams) for example at their peripheral edges. But, the first cushion layer and the second cushion layer may also be embodied by one airbag fabric, which is folded and connected to itself to form the airbag.

The tether arrangement is made of at least one tensile element, which can transfer tensile forces, such as a fabric, rope or the like. In a mounted state within the motor vehicle, the one end of the tether arrangement is connected directly or indirectly to a part of the motor vehicle, such as the vehicle seat or the chassis of the motor vehicle. The other part of the tether arrangement is connected to the airbag. In particular, the end of the tether arrangement is fixedly (without being movable relative) to the second cushion layer. Therefore, the tether arrangement extends through the first cushion layer from the outside of the airbag to the inside of the airbag. An extension through the first cushion layer is understood in such a way, that tensile forces applied to the tether arrangement at the second cushion layer can be transferred to the section of the tether arrangement being arranged outside the airbag. The tether arrangement may be made of exactly one tether (i.e. rope, fabric) or of multiple tethers.

In one embodiment, the tether arrangement comprises a first tether outside the airbag, the one end of the first tether being connectable to the motor vehicle, and at least one second tether inside the airbag, the first tether and the at least one second tether being connected to each other for transferring (tensile) forces from the second cushion layer via the at least one second tether to the first tether. Such multiple tethers allow to fixedly connect the at least one second tether to the second cushion layer during a first production step of the airbag, while the first tether can be connected to the airbag at a different time of production. The first tether and the at least one second tether may be connected directly or indirectly to each other. For example, multiple (two or more than two) second tethers may be arranged inside the airbag, while all of the second tethers are connected mutually to the one first tether, which is mainly arranged outside the airbag.

The tether arrangement may extend through the first cushion layer within a trunk of the airbag, in which case the trunk may also be arranged flexible to the first cushion layer, when the airbag is in a deployed state.

In this regard it is preferred, that the first tether and the at least one second tether are connected to each other within the trunk of the airbag, in which case the trunk, the first tether and the at least one second tether can be jointly connected by at least one seam, thereby minimizing the effort for producing the airbag arrangement.

In order to transfer forces from a bigger section of the second layer, the tether arrangement may broaden inside the airbag towards the second cushion layer. Accordingly, the tether arrangement has a first (smaller) width close to the first cushion layer (in the deployed state) and a (greater) second width, at the location, where it is fixed to the second cushion layer. The second width may be at least twice the first width.

The trunk may be made of one or more fabric elements, which are connected to the first cushion layer on a first side and to the tether arrangement on the opposite side, such that the connection between the tether arrangement and the trunk is flexible (moveable) to the first cushion layer, when the airbag is inflated. For example, the trunk may be connected to the first cushion layer near or at an opening, through which the tether arrangement and in particular the first tether extends through the first cushion layer. The trunk may be embodied such that it surrounds the arrangement, in particular close to the opening.

Preferably, the airbag of the airbag arrangement is to be arranged in a lateral side of a backrest of a vehicle seat, in which case the airbag may comprise a lateral section and a frontal section, wherein in the deployed state the lateral section is arranged laterally beside an occupant and the frontal section is arranged in front of the occupant, wherein the tether arrangement extends through the first cushion layer of the frontal section. In this connection it is further preferred that the tether arrangement outside the airbag extends from the deployed airbag over an upper side of the backrest to a backside of the backrest, where the tether arrangement is connected to the backrest.

The airbag may comprise an extension at the frontal section opposite to the lateral section which extension extends from the frontal section backwards towards the backrest of the vehicle seat, wherein a sail (i.e. made of fabric material) is extending from the extension to the lateral section along the frontal section, so that the sail is arranged between the occupant and the frontal section in the deployed state of the airbag.

The present invention also relates to a vehicle seat arrangement for a motor vehicle, comprising a backrest, a seat cushion and preferably also a seat belt arrangement, wherein an inventive airbag arrangement is arranged in the backrest, wherein the airbag is shaped in such a way, that in the deployed state, a frontal section of the airbag is arranged directly in front of a central axis of the backrest and wherein the tether arrangement is connected with one end to a backrest. It is also suggested that the tether arrangement may be connected to a backside of the backrest via a pretensioner, a load limiter and/or a tether retractor.

The invention and the technical background will now be described with regard to the figures. The figures show schematically FIG. 1: a top view on the airbag arrangement in a deployed state, FIG. 2: a perspective view in a partially cross section of a further embodiment of an airbag arrangement, FIG. 3: a cross sectional view through the airbag arrangement and FIG. 4: an even further embodiment of an airbag arrangement and FIG. 5: the extension of a tether arrangement through a first cushion layer of the airbag within a trunk.

FIG. 1 shows a first embodiment of an airbag arrangement in a top view. The airbag arrangement comprises an airbag 1, the inflated airbag 1 having a lateral section 11, a frontal section 1*f* and an extension 1*e*. In a deployed state, the lateral section 11 is arranged laterally beside an occupant 5, while the frontal section 1*f* is arranged in front of the occupant 5. The extension 1*e* extends from the frontal section 1*f* backwards parallel to the lateral section 11.

The airbag 1 has a first cushion layer 1.1 facing the occupant 5 in a deployed state and a second cushion layer 1.2 facing away from the occupant 5 in the deployed state.

The airbag arrangement further comprises a tether arrangement 2 made of a first tether 2.1 arranged outside the airbag 1 and a second tether 2.2 arranged inside the airbag 1. The second tether 2.2 is fixedly connected to the second cushion layer 1.2, so that the tether arrangement 2 extends from the second cushion layer 1.2 through the first cushion layer 1.1 to an end of the first tether 2.1, which is connected to a vehicle seat. Accordingly, tensile forces applied to the second cushion layer 1.2 of the airbag 1 may be transferred by the tether arrangement 2 towards the vehicle.

Figure 2:
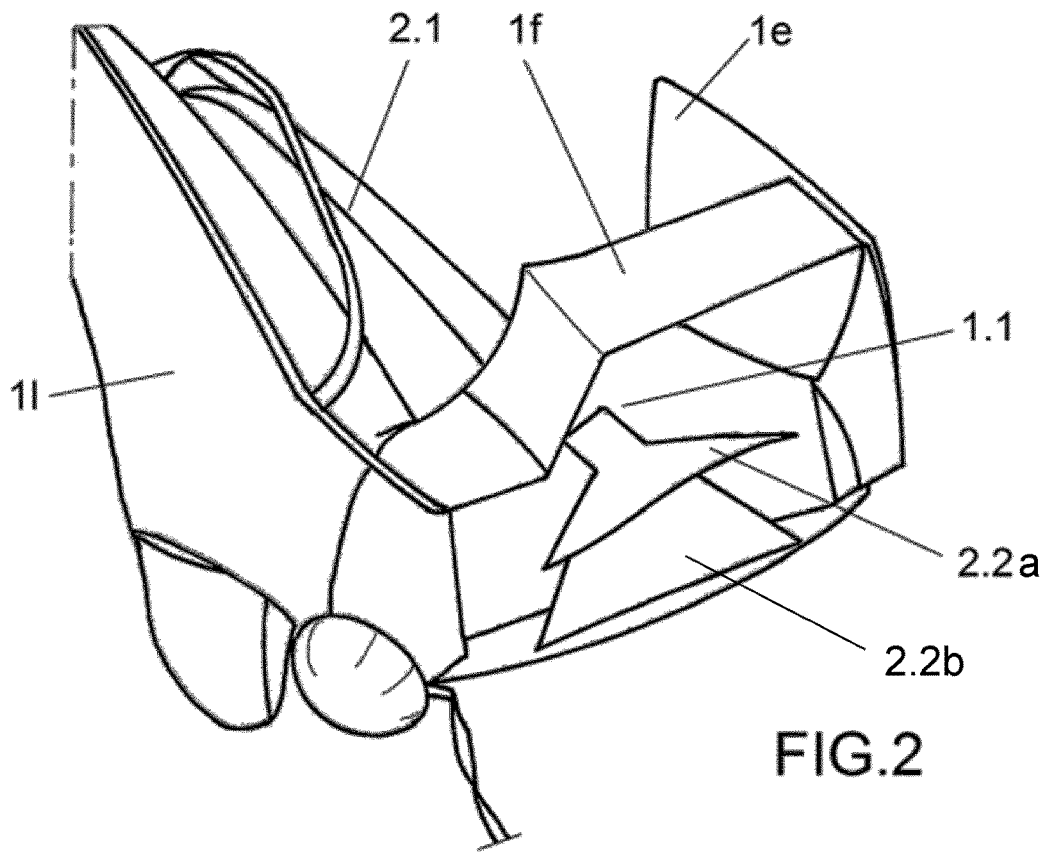

According to the embodiment shown in FIG. 2, two second tethers 2.2*a* and 2.2*b* are arranged inside the frontal section 1*f* of the airbag 1, which two tethers 2.2*a* and 2.2*b* broaden from the first cushion layer 1.1 towards the second cushion layer 1.2 (the second cushion layer 1.2 is not shown in FIG. 2).

Figure 3:
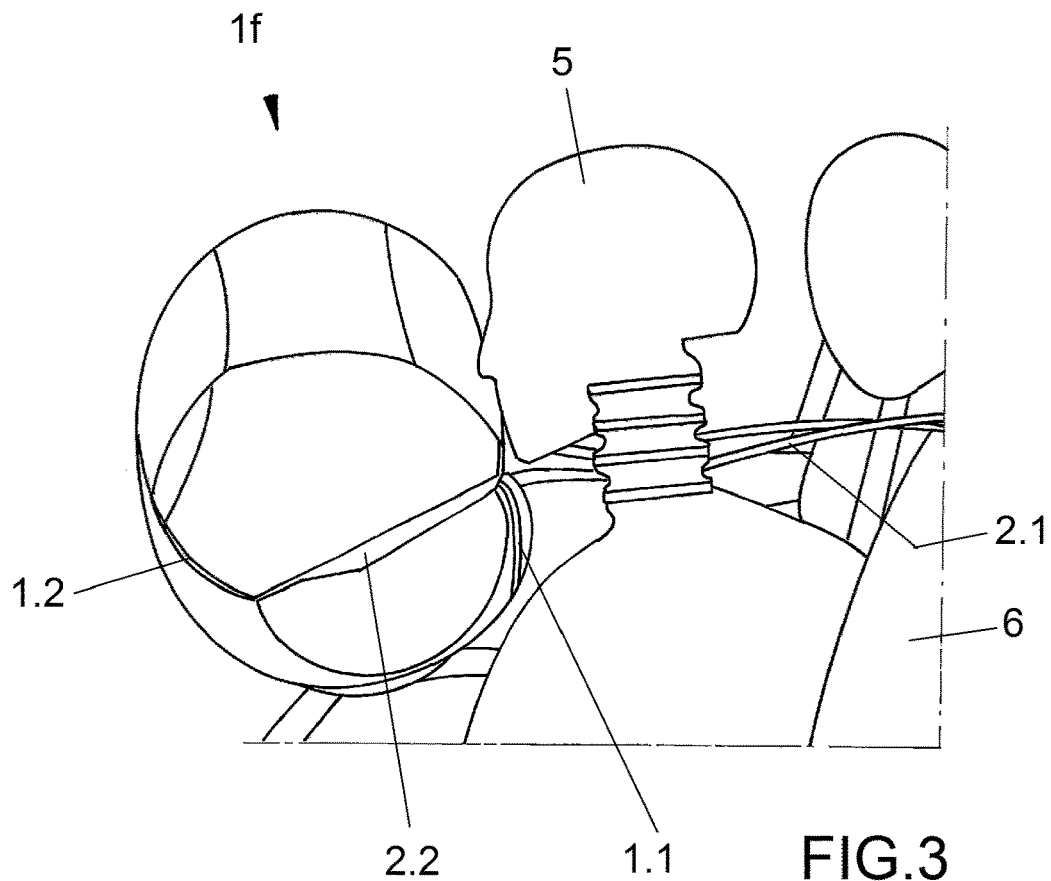

FIG. 3 shows a cross sectional view of the deployed airbag 1. It can be seen that the first tether 2.1 extends over the shoulder of an occupant 5 and over the top of a backrest 6 of a vehicle seat. It can also be seen that the location, where the tether arrangement 2 extends through the first cushion layer 1.1 is arranged close to the location, where the head of the occupant 5 comes into contact with the first cushion layer 1.1.

Figure 4:
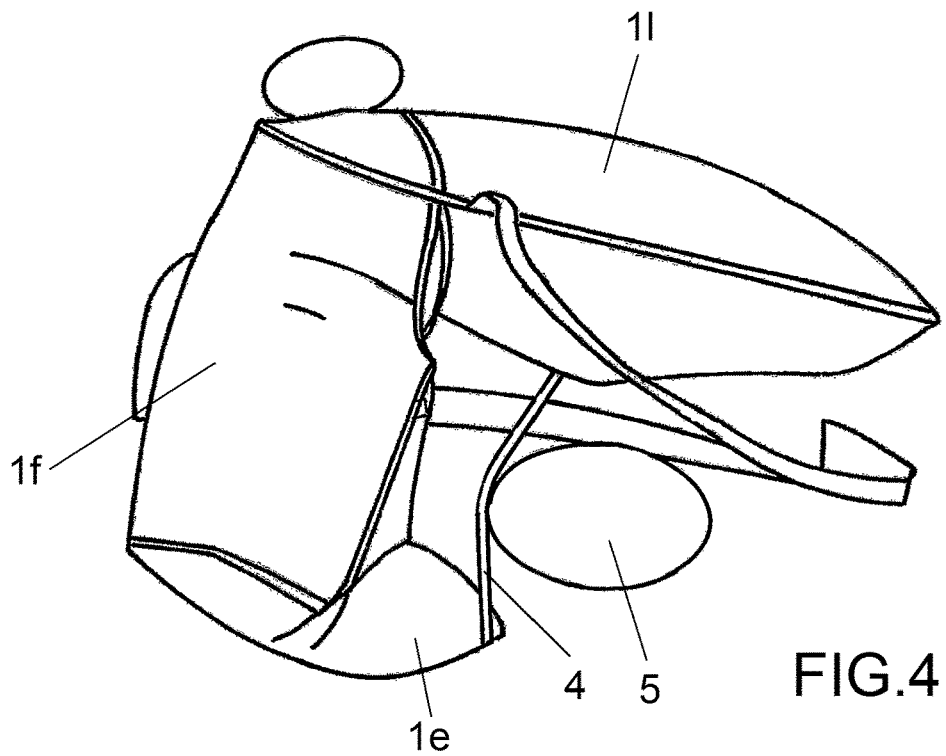

In FIG. 4 an embodiment of an airbag arrangement is shown, which is similar to the embodiment of FIG. 1. In this embodiment a sail 4 extends from the extension 1*e* of the airbag 1 along the frontal section 1*f* towards the lateral section 11 of the airbag, so that the sail 4 is arranged between the occupant 5 and the frontal section 1*f* of the deployed airbag 1.

Figure 5:
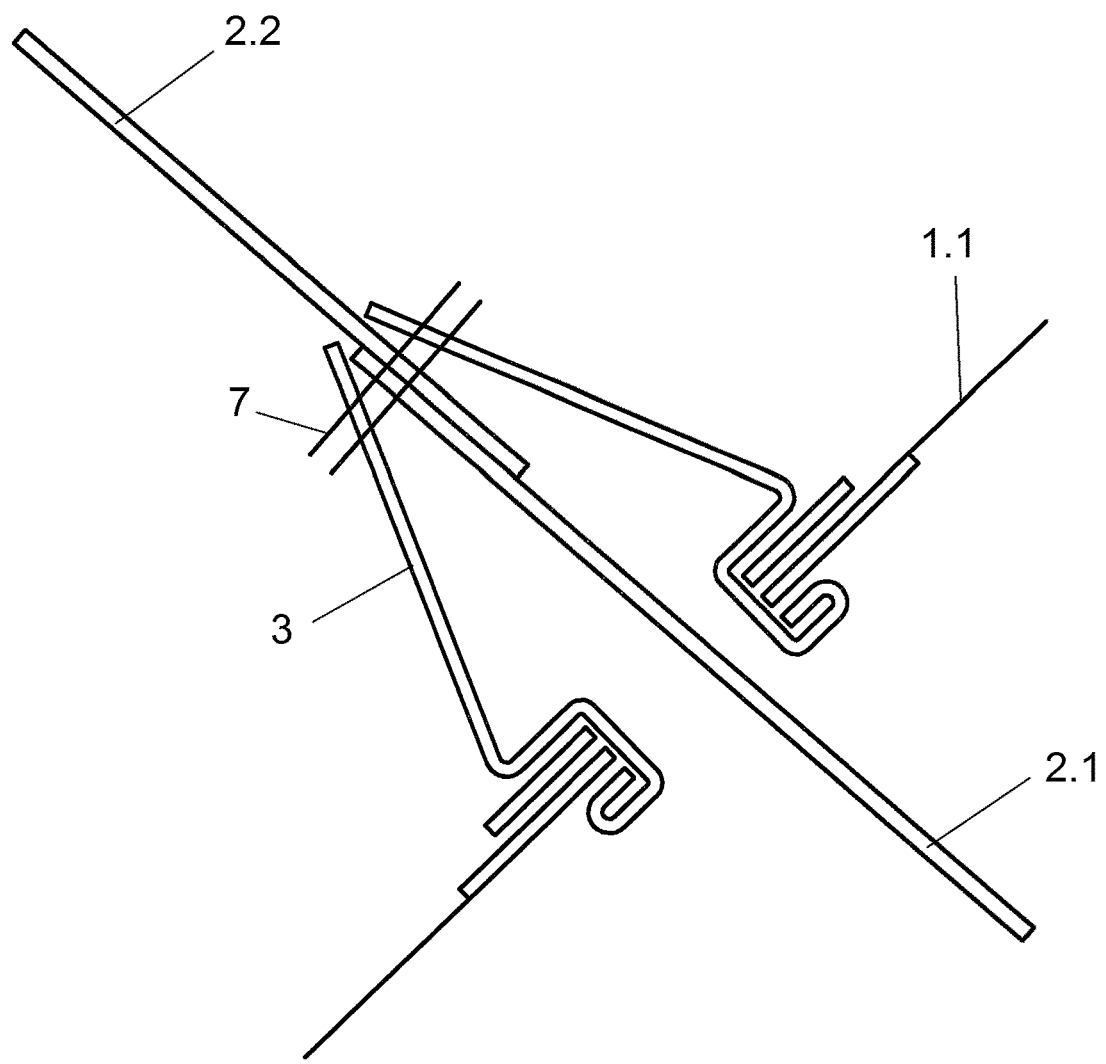

FIG. 5 shows the location, at which the tether arrangement 2 comprising the first tether 2.1 and the second tether 2.2 extends through the first cushion layer 1.1. In this section, the airbag 1 comprises a trunk 3 made of fabric material, which is connected to the first cushion layer 1.1 and which surrounds the tether arrangement 2. The first tether 2.1 and the second tether 2.2 as well as the trunk 3 are mutually connected by a seam 7. The trunk 3 may be part of a venting valve. By such an arrangement the tethers 2.1 and 2.2 are at least partly movable (flexible) to the first cushion layer 1.1, when the airbag 1 is inflated.

REFERENCE LIST

1 Airbag
1.1 First cushion layer
1.2 Second cushion layer
1*f* Frontal section
11 Lateral section
1*e* Extension
2 tether arrangement
2.1 First tether
2.2 Second tether
3 Trunk
4 Sail
5 Occupant
6 Backrest
7 Seam

The invention claimed is:

1. An airbag arrangement for a motor vehicle, comprising:
an airbag including:
  a lateral section; and
  a frontal section comprising:
    a first cushion layer; and
    a second cushion layer opposite to the first cushion layer, wherein in a deployed state the lateral section is arranged laterally beside an occupant and the frontal section is arranged in front of the occupant; and at least one tether arrangement, the tether arrangement being connected to the airbag and being connectable with one end to the motor vehicle outside the airbag, wherein the tether arrangement extends from the outside of the airbag through the first cushion layer to the second cushion layer.

2. The airbag arrangement according to claim 1, wherein the tether arrangement comprises a first tether outside the airbag, the one end of the first tether being connectable to the motor vehicle, and at least one second tether inside the airbag, the first tether and the at least one second tether being connected to each other for transferring forces from the second cushion layer via the at least one second tether to the first tether.

3. The airbag arrangement according to claim 2, wherein the connection between the first tether and the at least one second tether is within a trunk of the airbag.

4. The airbag arrangement according to claim 3, the trunk being flexible to the first cushion layer in the deployed state.

5. The airbag arrangement according to claim 3, the trunk, the first tether and the at least one second tether being connected jointly by at least one seam.

6. The airbag arrangement according to claim 1, wherein the second tether broadens towards the second cushion layer.

7. The airbag arrangement according to claim 1, wherein the airbag comprises an extension at the frontal section opposite to the lateral section, which extension extends from the frontal section backwards, wherein a sail is extending from the extension to the lateral section along the frontal section, so that the sail is arranged between the occupant and the frontal section in the deployed state.

8. A vehicle seat arrangement for a motor vehicle, with
a backrest,
a seat cushion, and
an air bag arrangement according to claim 1, wherein an airbag module comprising the airbag is arranged in the backrest and the airbag is shaped in such a way that in the deployed state the frontal section of the airbag is arranged directly in front of a central axis of the backrest and wherein the tether arrangement is connected with the one end to the backrest.

9. The vehicle seat arrangement according to claim 8, wherein the tether arrangement is connected to a back side of the backrest via a pretensioner, a load limiter and/or a tether retractor.

10. An airbag arrangement for a motor vehicle, comprising:
an airbag including:
a first cushion layer; and
a second cushion layer opposite to the first cushion layer;
a trunk connected to the first cushion layer and extending into the airbag, wherein the trunk is flexible to the first cushion layer in a deployed state of the airbag; and
a tether arrangement comprising:
a first tether outside the airbag connectable to the motor vehicle; and
a second tether inside the airbag connected to the airbag, the first tether and the second tether connected to each other within the trunk, the trunk surrounding the tether arrangement adjacent the first cushion layer.

11. The airbag arrangement according to claim 10, wherein the trunk, the first tether, and the at least one second tether are connected by at least one seam.

12. The airbag arrangement according to claim 10, wherein the second tether broadens towards the second cushion layer.

13. The airbag arrangement according to claim 10, wherein the trunk comprises:
a first end adjacent the first cushion layer; and
a second end within the airbag, wherein the trunk narrows from the first end to the second end.

14. The airbag arrangement according to claim 13, wherein the first end extends outside of the airbag to an exterior of the first cushion layer.

15. The airbag arrangement according to claim 10, wherein the airbag comprises a frontal section, wherein in the deployed state the frontal section is arranged in front of the occupant, wherein the frontal section includes the first cushion layer and the second cushion layer.

16. The airbag arrangement according to claim 15, wherein the airbag comprises an extension at the frontal section, which extension extends from the frontal section backwards, wherein a sail extends from the extension along the frontal section such that the sail is arranged between the occupant and the frontal section in the deployed state.

17. A vehicle seat arrangement for a motor vehicle, with
a backrest,
a seat cushion, and
an air bag arrangement according to claim 15, wherein an airbag module comprising the airbag is arranged in the backrest and the airbag is shaped in such a way that in the deployed state a frontal section of the airbag is arranged directly in front of a central axis of the backrest and wherein the tether arrangement is connected with the one end to the backrest.

18. The vehicle seat arrangement according to claim 17, wherein the tether arrangement is connected to a back side of the backrest via a pretensioner, a load limiter and/or a tether retractor.

* * * * *